(12) United States Patent
Chang et al.

(10) Patent No.: US 6,851,014 B2
(45) Date of Patent: Feb. 1, 2005

(54) MEMORY DEVICE HAVING AUTOMATIC PROTOCOL DETECTION

(75) Inventors: Chieh Chang, Hillsborough, CA (US); Jianhui Xie, Milpitas, CA (US); Deqi Gao, San Jose, CA (US)

(73) Assignee: Programmable Microelectronics Corp., San Jose, CA (US)

(*) Notice: Subject to any disclaimer, the term of this patent is extended or adjusted under 35 U.S.C. 154(b) by 129 days.

(21) Appl. No.: 10/104,944

(22) Filed: Mar. 22, 2002

(65) Prior Publication Data

US 2003/0182495 A1 Sep. 25, 2003

(51) Int. Cl.[7] .............................................. G06F 12/00
(52) U.S. Cl. ........................ 711/103; 711/145; 713/2
(58) Field of Search ................................ 711/103, 145; 713/2

(56) References Cited

U.S. PATENT DOCUMENTS

| | | | |
|---|---|---|---|
| 6,188,602 B1 | 2/2001 | Alexander et al. | 365/185.04 |
| 6,286,097 B1 * | 9/2001 | Chang et al. | 713/2 |
| 6,330,635 B1 | 12/2001 | Stafford | 711/103 |
| 6,421,765 B1 * | 7/2002 | Poisner | 711/145 |

* cited by examiner

*Primary Examiner*—Mano Padmanabhan
*Assistant Examiner*—Thang Ho
(74) *Attorney, Agent, or Firm*—William L Paradice, III

(57) ABSTRACT

A memory device includes a memory array, a first protocol circuit, a second protocol circuit, an operation interface, and a protocol detection circuit. The first protocol circuit, which implements a first communication protocol, and the second protocol circuit, which implements a second communication protocol, are coupled in parallel between the memory array and the operation interface. The protocol detection circuit, which is coupled to the operation interface and to the first and second protocol circuits, monitors control signals provided to the operation interface by a host controller to determine which communication protocol the host controller employs. In response thereto, the protocol detection circuit selects one of the first and second protocol circuits to handles communication between the host controller and the memory device.

18 Claims, 7 Drawing Sheets

MEMORY DEVICE HAVING AUTOMATIC PROTOCOL DETECTION

BACKGROUND

1. Field of Invention

This invention relates generally to memory devices and specifically to an interface for flash memory.

2. Description of Related Art

A motherboard is the main circuit board inside a computer that holds the processor, system memory, and expansion slots. The motherboard, which is connected either directly or indirectly to every part of the computer, includes a control chipset, a firmware memory, and various buses that link the motherboard components together. The control chipset includes a memory controller hub and an input/output (I/O) controller hub. The memory controller hub controls communication between motherboard components and the system memory, while the I/O controller hub controls communication between motherboard components and peripheral I/O devices.

Typically, the firmware memory is a Basic Input Output System (BIOS) memory device for storing firmware code that enables communication between the computer's operating system, computer hardware, and peripheral components. The firmware code also provides the initial instructions and configuration information for the processor when the computer is powered on. The BIOS memory device is typically accessed via the I/O controller hub.

Presently, different chipset manufacturers employ different communication protocols for their control chipsets. For example, Intel Corporation employs the well-known firmware hub (FWH) protocol for its control chipset, and VIA Technologies, Inc. employs the well-known low pin count (LPC) protocol for its control chipset. Because the FWH and LPC protocols are not compatible, but rather require unique interfaces in order to properly communicate with the chipset, the interface of a BIOS memory device to be mounted on a motherboard must be compatible with the communication protocol of the control chipset. As a result, manufacturers of BIOS memory devices typically offer a plurality of different BIOS memory devices, each having an interface compatible with a particular chipset manufacturer's communication protocol. Thus, for example, many memory manufacturers offer both a FWH-compatible BIOS memory device and a LPC-compatible BIOS memory device in order to maximize market share.

One problem with offering different BIOS memory devices is that each requires its own fabrication process. Another problem is that it may be difficult to predict in advance how many memory devices of each type will ultimately be sold, and since each is incompatible, an abundance of one cannot be used to satisfy a shortage of the other. In addition, providing a single BIOS memory device that can be used with control chipsets from a variety of different manufacturers may provide a unique and advantageous marketing opportunity.

SUMMARY

A method and apparatus are disclosed that allow a memory device to be used with different communication protocols. In accordance with the present invention, a memory device includes a memory array, a first protocol circuit, a second protocol circuit, an operation interface, and a protocol detection circuit. The first protocol circuit, which implements a first communication protocol, and the second protocol circuit, which implements a second communication protocol, are coupled in parallel between the memory array and the operation interface. The protocol detection circuit, which is coupled to the operation interface and to the first and second protocol circuits, monitors control signals provided to the operation interface by a host controller to determine which communication protocol the host controller employs. In response thereto, the protocol detection circuit selects one of the first and second protocol circuits to handle communication between the host controller and the memory device. In this manner, the memory device may be compatible with more than one communication protocol, and therefore may be used with motherboards having different host controllers or chipsets from competing manufacturers.

For some embodiments, the protocol detection circuit enables one protocol circuit and disables the other protocol circuit in response to the control signals from the host controller. For other embodiments, a multiplexer coupled to the first and second protocol circuits and receiving a select signal from the protocol detection circuit selects which protocol circuit handles communication with the host controller. For one embodiment, the memory device may include more than two protocol circuits to allow the memory device to be compatible with more than two communication protocols.

BRIEF DESCRIPTION OF THE DRAWINGS

The features and advantages of the present invention are illustrated by way of example and are by no means intended to limit the scope of the present invention to the particular embodiments shown, and in which.

Like reference numerals refer to corresponding parts throughout the drawing figures.

DETAILED DESCRIPTION

Present embodiments are discussed below in the context of a computer system 100 for simplicity only. It is to be understood that present embodiments are equally applicable to any suitable computer system. Further, the particular logic levels assigned to signals and control bits discussed herein are arbitrary, and thus may be reversed where desirable. In addition, single signal lines may alternatively be multiple signal lines or buses, and multiple signal lines or buses may be single signal lines. Accordingly, the present invention is not to be construed as limited to specific examples described herein but rather includes within its scope all embodiments defined by the appended claims.

Figure 1:
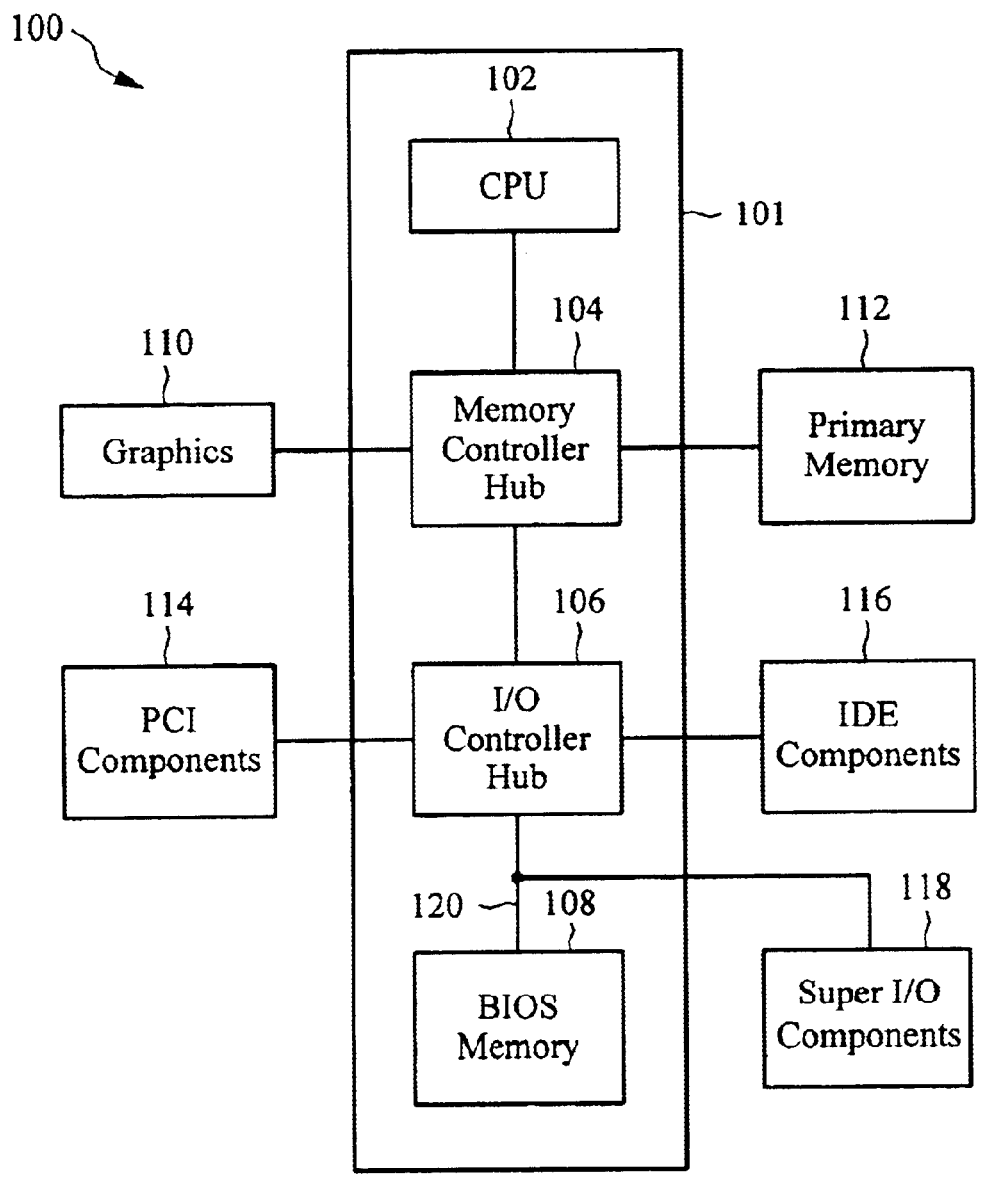
FIG. 1 is a block diagram of a motherboard upon which a memory device in accordance with the present invention may be mounted.

FIG. 1 illustrates a computer system 100 within which memory devices of the present invention may be mounted. Computer system 100 includes a motherboard 101 containing a central processing unit (CPU) 102, a memory controller hub (MCH) 104, an I/O control hub (ICH) 106, and a BIOS memory device 108. Together, MCH 104 and ICH 106 form the control chipset. Although shown as separate components in FIG. 1, in other embodiments, MCH 104 and ICH 106 may be integrated into a single component. MCH 104 is well-known, and controls operations between CPU 102 and memory devices such as, for example, graphics memory 110 and primary memory 112. Graphics memory 110 is well-known and may be used to control graphics for a monitor (not shown). Primary memory 112 is a well-known DRAM device that stores computer programs to be executed by CPU 102.

ICH 104 controls operations between CPU 102 and I/O devices such as, for example, well-known PCI components 114, IDE components 116, and super I/O components 118. For example, although not shown in FIG. 1 for simplicity, PCI components 114 may include a modem, IDE components 116 may include a hard disk drive, and super I/O components may include a keyboard, a mouse 74, and/or serial and parallel ports. ICH 70 also controls operations between CPU 102 and BIOS memory device 108 via bus 120. ICH 106 may be any well-known I/O controller hub that uses any suitable communication protocol. For one embodiment, ICH 106 is part of a chipset manufactured by Intel Corporation, and may employ the well-known FWH communication protocol. For another embodiment, ICH 106 is part of a chipset manufactured by VIA Technologies, Inc., and may employ the well-known LPC communication protocol.

BIOS memory device 108 is a non-volatile memory such as flash memory that stores firmware code that is used to configure the various components of computer system 100 so as to properly communicate with each other. For one embodiment, BIOS memory device 108 stores low level code that enables communication between computer system's 100 hardware components and operation system. For one embodiment, the operating system of computer system 100 is stored in a well-known IDE drive 116. When computer system 100 is powered on or otherwise "booted up," firmware code is fetched from BIOS memory 108 via ICH 106 and placed into primary memory 112, where it may be used to load the operating system of computer system 100. Although shown in FIG. 1 as residing on motherboard 101, in other embodiments, BIOS memory device 108 may reside on other system boards.

In accordance with the present invention, BIOS memory device 108 includes multiple communication protocol circuits that allow memory device 108 to communicate with ICH 106 regardless of the particular communication protocol used by ICH 106. BIOS memory device 108 includes a protocol detection circuit (not shown in FIG. 1) that monitors control signals provided by ICH 106 to determine which communication protocol ICH 106 employs, and then automatically selects a compatible protocol circuit to handle communications between memory device 108 and ICH 106. For one embodiment, the protocol detection circuit enables the compatible protocol circuit and disables all other protocol circuits. In this manner, the same BIOS memory 108 may be mounted on motherboard 101 and used with ICH 106 regardless of the communication protocol employed by the control chipset, thereby allowing for the manufacture of a BIOS memory device that may be used with different chipset manufacturers.

Figure 2:
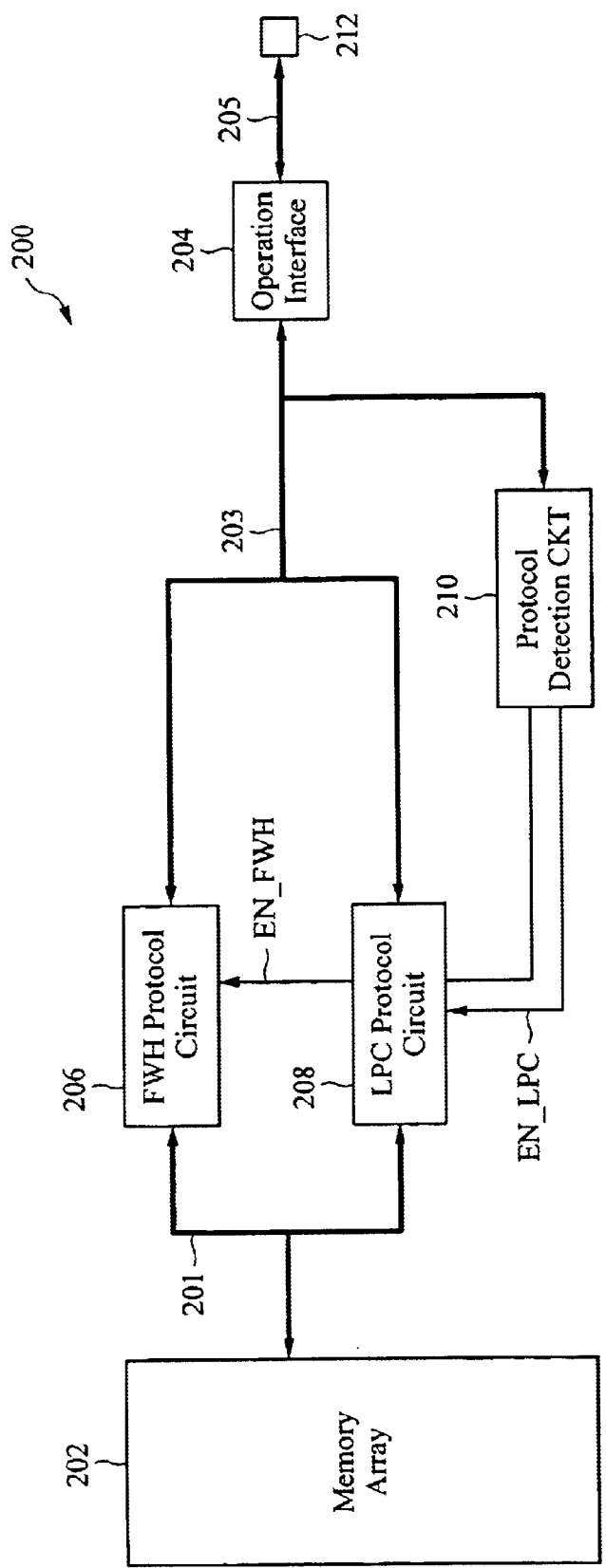
FIG. 2 is a block diagram of a memory device in accordance with one embodiment of the present invention.

FIG. 2 shows a memory device 200 that is one embodiment of the memory device 108 of FIG. 1. Memory device 200 includes an array 202, an operation interface 204, a firmware hub (FWH) protocol communication circuit 206, a low pin count (LPC) communication protocol circuit 208, a communication protocol detection circuit 210, and I/O pins 212. I/O pins 212 are connected to a host controller such as, for example, ICH 106 of motherboard 101 (see also FIG. 1). Although only one I/O pin 212 is shown in FIG. 2 for simplicity, actual embodiments include a plurality of I/O pins that may be positioned around the periphery of memory device 200. Other well-known components and features of memory device 200 such as, for example, a parallel mode interface circuit for testing and programming memory device 200, are not shown in FIG. 2 for simplicity.

It is to be noted that protocol circuits other than those implementing FWH and LPC communication protocols may be used for protocol circuits 206 and 208; indeed, the protocol circuits 206 and 208 may implement any suitable communication protocol, whether well-known or proprietary. Further, although shown in FIG. 2 as having two protocol circuits 206 and 208, for other embodiments, memory device 200 may include a greater number of communication protocol circuits.

Array 202 includes a plurality of non-volatile memory cells (not shown for simplicity) for storing any suitable and well-known firmware code for enabling the start-up of computer system 100. For some embodiments, the memory cells of array 202 are well-known flash memory cells. For one embodiment, the memory cells of array 202 are PMOS floating gate memory cells available from Programmable Mircoelectronics Corporation of San Jose, Calif., although other types of memory cells may be used, including NMOS memory cells. Examples of suitable types of PMOS floating gate memory cells are described in U.S. Pat. Nos. 6,166,954; 5,912,842; 5,841,165; 5,761,121; 5,706,227; 5,691,939; 5,687,118; and 5,666,307; all incorporated by reference herein.

Memory array 202 is coupled to FWH protocol circuit 206 and to LPC protocol circuit 208 via bus 201 that may provide address, data, and control information to memory array 202. For the embodiment shown in FIG. 2, address, data, and control information may be multiplexed onto the same inputs to memory array 202. Although not shown in FIG. 2 for simplicity, in other embodiments memory array 202 may include separate address and data ports coupled to FWH protocol circuit 206 and LPC protocol circuit 208 via dedicated address and data buses, respectively. The address and data buses may be of any suitable width. For one embodiment, the address and data buses are each 4 bits wide. In addition, memory array 202 may include a control port coupled to FWH protocol circuit 206 and LPC protocol circuit 208 via a separate control bus (not shown for simplicity). The control bus may provide well-known control signals such as, for example, clock and enable signals, to memory array 202.

Operation interface 204 is coupled to I/O pins 212 of memory device 200 via bus 205. Operation interface 204 is a well-known interface component that is used during an operational mode to communicate with a host controller (e.g., ICH 106 of FIG. 1) via pins 212. Operation interface 204 includes a plurality of pads or pins (not shown for simplicity) connected to I/O pins 212 to receive a clock signal, data and address information, configuration signals, device ID information, and other control information. For some embodiments, addresses and data are multiplexed on the same pins to reduce pin count. During the operational mode, operation interface 204 may be used to write data to and read data from memory array 202. For one embodiment, operation interface 204 may be eliminated, and the I/O pins of FWH protocol circuit 206 and the I/O pins of LPC protocol circuit 208 are connected directly to corresponding device I/O pins 212.

Figure 3:
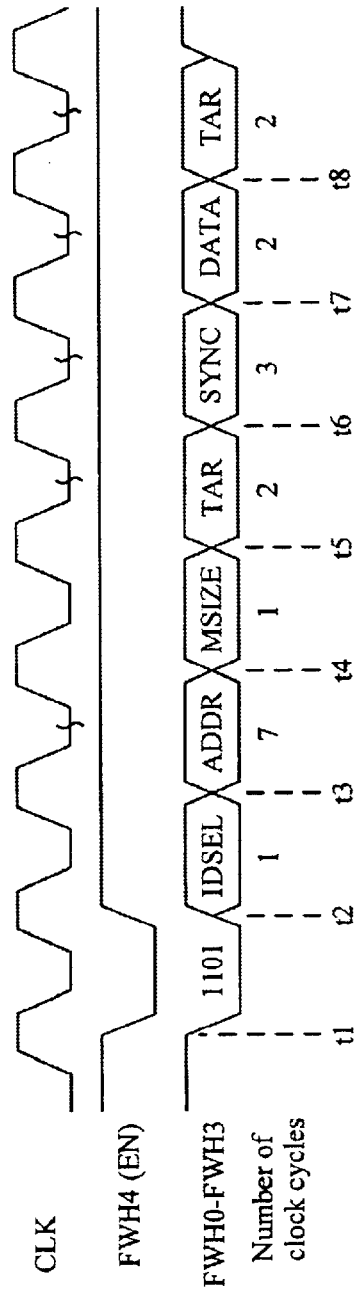
FIG. 3 is a timing diagram illustrating a read cycle for a firmware hub communication protocol.
Figure 4:
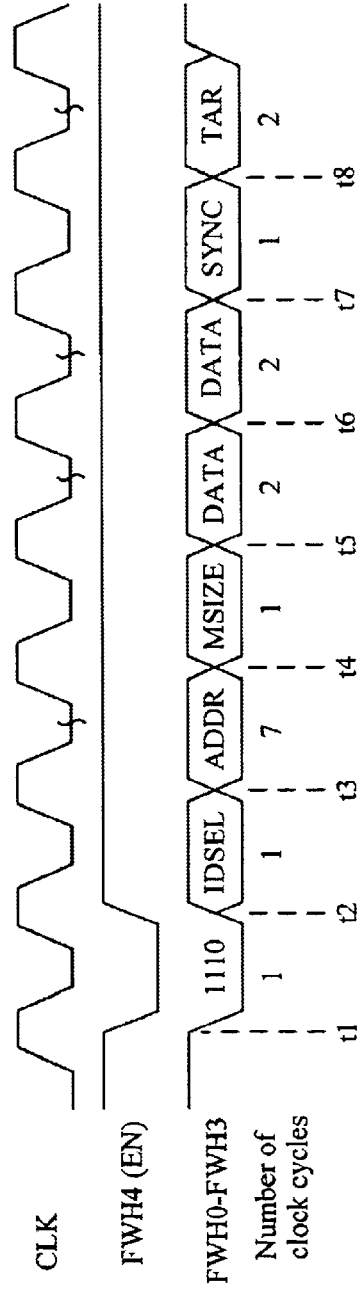
FIG. 4 is a timing diagram illustrating a write cycle for a firmware hub communication protocol.

FWH protocol circuit 206 is coupled to operation interface 204 via bus 203. For one embodiment, FWH protocol circuit 206 receives an enable signal EN_FWH from protocol detection circuit 210. FWH protocol circuit 206 is a well-known circuit that facilitates communication according to the FWH communication protocol, for which read and write cycles are illustrated in FIGS. 3 and 4, respectively. For some embodiments, FWH protocol circuit 206 includes a clock pin CLK, four address/data pins FWH0–FWH3, and an enable pin EN (also referred to in the art as FWH4). For other embodiments, FWH protocol circuit 206 may have additional inputs to receive other signals. For some embodiments, FWH protocol circuit 206 is an integrated circuit mounted onto memory device 200. For other embodiments, FWH protocol circuit 206 may be formed as an integrated part of memory device 200.

Figure 5:
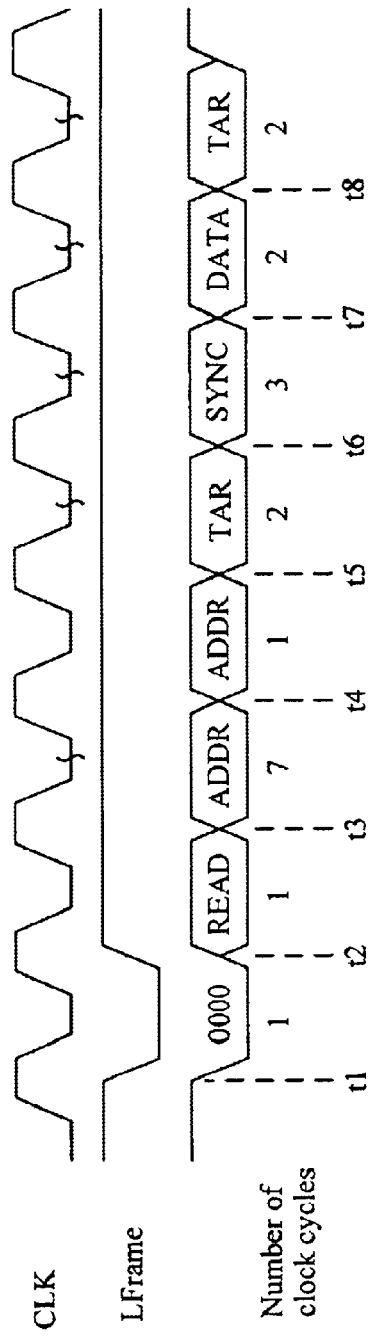
FIG. 5 is a timing diagram illustrating a read cycle for a low pin count communication protocol.
Figure 6:
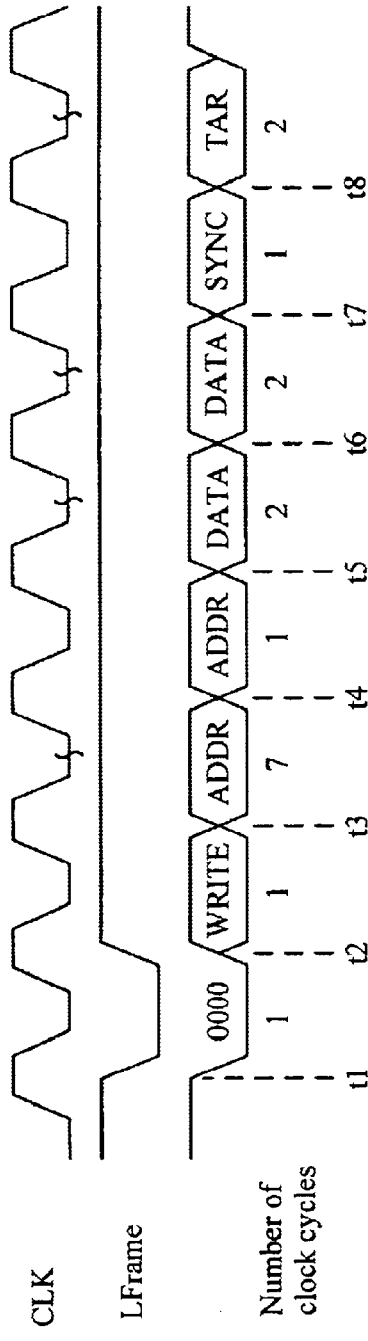
FIG. 6 is a timing diagram illustrating a write cycle for a low pin count communication protocol.

LPC protocol circuit 208 is coupled to operation interface 204 via bus 203. For one embodiment, LPC protocol circuit 208 receives an enable signal EN_LPC from protocol detection circuit 210. LPC protocol circuit 208 is a well-known circuit that facilitates communication according to the LPC communication protocol, for which read and write cycles are illustrated in FIGS. 5 and 6, respectively. For some embodiments, LPC protocol circuit 208 includes a clock pin CLK, four address/data pins LAD0–LAD3, and an enable pin EN (also referred to in the art as LFrame). For other embodiments, LPC protocol circuit 208 may have additional inputs to receive other signals. For some embodiments, LPC protocol circuit 208 is an integrated circuit mounted onto memory device 200. For other embodiments, LPC protocol circuit 208 may be formed as an integrated part of memory device 200.

Protocol detection circuit 210 monitors signals provided to operation interface 204 via bus 203 to determine whether the host controller (e.g., ICH 106 of motherboard 101) employs the FWH communication protocol or the LPC communication protocol. For other embodiments, protocol detection circuit 210 may be coupled to a separate port of operation interface 204 or coupled directly to I/O pins 212. In response thereto, protocol detection circuit 210 selectively enables FWH protocol circuit 206 or LPC protocol circuit 208 to handle communications between the host controller and memory device 200. For some embodiments, protocol detection circuit 210 compares a start code driven onto I/O pins 212 by the host controller with one or more stored codes to determine whether the host controller is using the FWH communication protocol or the LPC communication protocol. In this manner, protocol detection circuit 210 determines which communication protocol the host controller is using, and automatically selects the appropriate communication protocol circuit 206 or 208 to handle communications between the host controller and memory device 200. As a result, memory device 200 may be used in motherboards having chipsets that employ either the FWH communication protocol or the LPC communication protocol, thereby eliminating the need for manufacturing one memory device for FWH-compatible chipsets and another memory device for LPC-compatible chipsets.

Read operations for the FWH communication protocol are illustrated in FIG. 3. At time t1, the host controller pulses EN (or FWH4) to logic low, and applies a read command code of "1101" to FWH0–FWH3. At time t2, EN returns to its logic high state, and a device identification code (IDSEL) is provided on FWH0–FWH3 to select memory device 200. At time t3, the host controller drives four address bits on FWH0–FWH3 during seven successive clock cycles to form a 28-bit address ADDR. At time t4, a parameter MSIZE indicative of the data transfer size is provided on FWH0–FWH3. For one embodiment, MSIZE is set to "0000" to indicate single byte transfers. At time t5, the host controller drives FWH0–FWH3 to a predetermined state to indicate a turnaround (TAR) cycle. For one embodiment, the TAR code is set to "1111" during the first TAR cycle to initiate the TAR cycle. During the second TAR clock cycle, memory device 200 assumes control of FWH0–FWH3. At time t6, memory device 200 drives FWH0–FWH3 to a predetermined state to indicate receipt of a read command and synchronization with the host controller. For one embodiment, the predetermined state for synchronization is "0000". At time t7, memory device 200 drives data identified by ADDR from array 202 to FWH0–FWH3 in three successive clock cycles. For one embodiment, this data is firmware code for enabling start-up of computer system 100, although other data may be read out from memory device 200. At time t8, two additional TAR cycles are provided, and the host controller again assumes control of FWH0–FWH3 via pins 212.

Write operations for the FWH communication protocol are illustrated in FIG. 4. At time t1, EN (or FWH4) is pulsed to logic low and a write command code of "1110" is applied to FWH0–FWH3. At time t2, EN returns to its logic high state, and IDSEL is provided on FWH0–FWH3 to select memory device 200. At time t3, the host controller drives four address bits on FWH0–FWH3 during seven successive clock cycles to form the 28-bit address ADDR. At time t4, MSIZE is provided on FWH0–FWH3. At time t5, the host controller drives data to memory device 200 via FWH0–FWH3 in two successive clock cycles. At time t6, two successive TAR cycles are provided, and memory device 200 assumes control of FWH0–FWH3. At time t7, memory device 200 acknowledges receipt of the data from the host controller and synchronization with the host controller. At time t8, two successive TAR cycles are provided, and the host controller again assumes control of FWH0–FWH3 via pins 212.

Read operations for the LPC communication protocol are illustrated in FIG. 5. At time t1, the host controller pulses EN (or LFrame) to logic low, and applies a start code of "0000" to LAD0–LAD3. At time t2, EN returns to its logic high state, and the host controller drives a read code on LAD0–LAD3 to indicate a read operation for memory device 200. For embodiment, the read code is of the form "010x", where "x" is a don't care. At time t3, the host controller drives four address bits onto LAD0–LAD3 during seven successive clock cycles, and at time t4 drives four additional address bits onto LAD0–LAD3 to form a 32-bit address ADDR. At time t5, two successive TAR cycles are provided on LAD0–LAD3. During the first TAR cycle, the host controller drives LAD0–LAD3 to a predetermined state, and during the second TAR cycle the LAD0–LAD3 inputs are tri-stated. At time t6, WSYNA (wait_Sync "0101") for between 0 and 8 cycles and one cycle RSYNC (Ready_Sync "0000") are provided to allow for synchronization between the host controller and memory device 200. At time t7, memory device 200 drives data identified by ADDR onto LAD0–LAD3 during two successive clock cycles. At time t8, another TAR cycle is provided, and the host controller again assumes control of LAD0–LAD3 via pins 212.

Write operations for the LPC communication protocol are illustrated in FIG. 6. At time t1, EN (or LFrame) is pulsed to logic low and the start code of "0000" is applied to LAD0–LAD3. At time t2, EN returns to its logic high state, and the host controller drives a write code onto FWH0–FWH3 to indicate a write operation. For one embodiment, the write code is of the form "011x". At time t3, the host controller drives four address bits onto LAD0–LAD3 in seven successive clock cycles, at time t4 drives four additional address bits onto LAD0–LAD3 to form a 32-bit address ADDR. At time t5, the host controller drives data to memory device 200 via LAD0–LAD3 in two successive clock cycles. At time t6, the two successive TAR cycles are provided. At time t7, a RSYNC (Ready_Sync "0000") cycle is provided to allow for synchronization between the host controller and memory device 200. At time t8, another TAR cycle is provided, and the host controller again assumes control of LAD0–LAD3 via pins 212.

Figure 7:
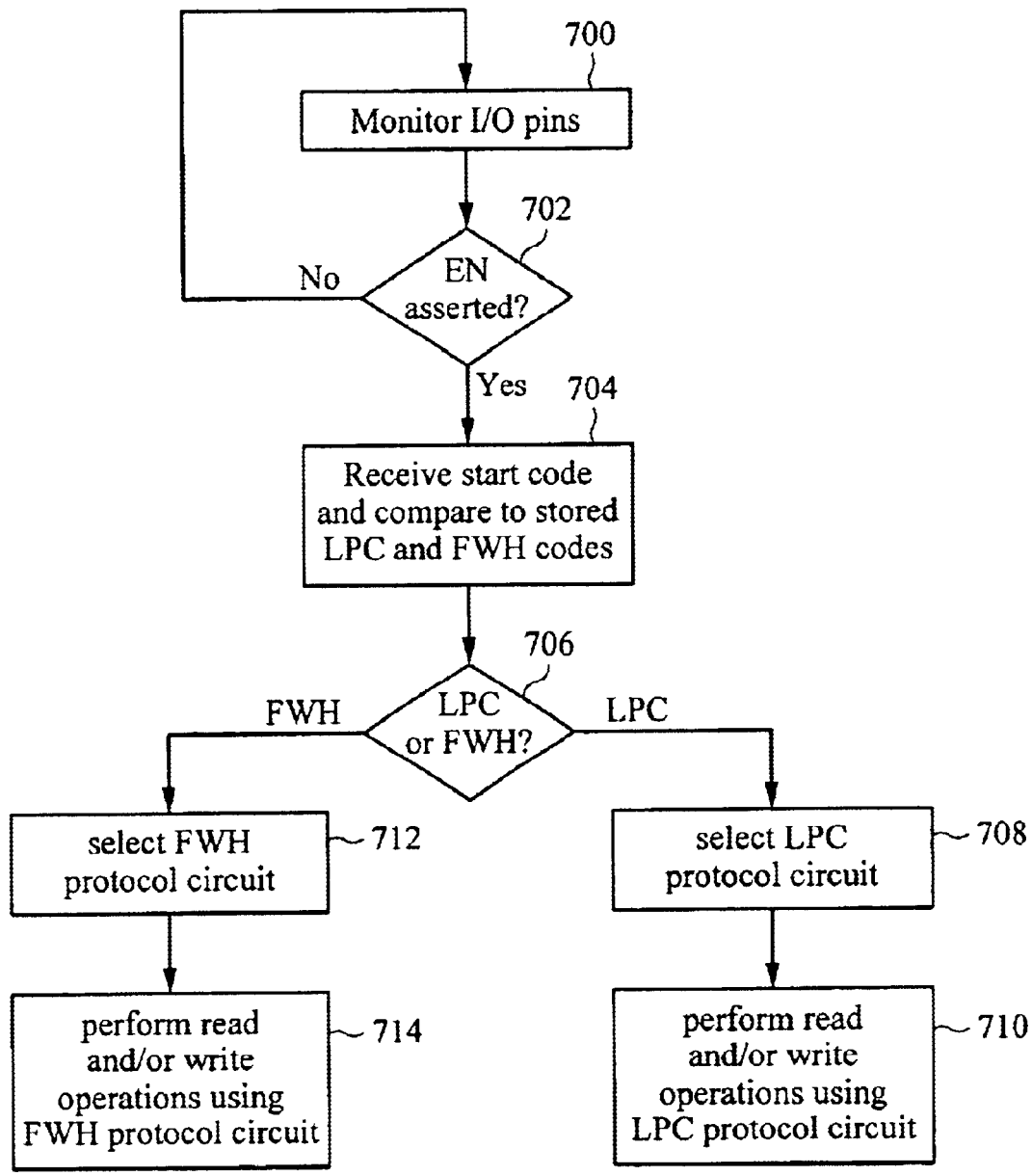
FIG. 7 is a flow chart illustrating operation of one embodiment of the present invention device in determining which communication protocol a host controller employs.

Operation of one embodiment of memory device 200 is described below with respect to the flow chart of FIG. 7. Initially, memory device is idle and monitors I/O pins 212 via operation interface 204 (step 700). If the enable signal EN is in its de-asserted logic high state, as tested at step 702, protocol detection circuit 210 continues to monitor I/O pins 212. If EN is asserted to logic low, protocol detection circuit 210 receives the start code provided by the host controller via I/O pins 212 via operation interface 204 and compares the start code to stored start codes for the FWH and LPC communication protocols (step 704). If the start code received from I/O pins 212 is of a first value indicative of the LPC communication protocol, as tested in step 706, protocol detection circuit 210 selects LPC protocol circuit 206 to handle communications with the host controller (step 708). Specifically, if the received start code is "0000", protocol detection circuit 210 asserts EN_LPC to enable LPC protocol circuit 208 and de-asserts EN_FWH to disable FWH protocol circuit 206. Thereafter, LPC protocol circuit 208 handles read and write operations for memory device in a well-known manner using the LPC communication protocol (step 710).

Conversely, if the start code received from I/O pins 212 is of a second value indicative of the FWH communication protocol, protocol detection circuit 210 selects FWH protocol circuit 206 to handle communications with the host controller (step 712). Specifically, if the received start code is "1101" (which indicates a FWH read operation) or "1110" (which indicates a FWH write operation), protocol detection circuit 210 asserts EN FWH to enable FWH protocol circuit 206 and de-asserts EN_LPC to disable LPC protocol circuit 208. Thereafter, FWH protocol circuit 206 handles read and write operations for memory device in a well-known manner using the FWH communication protocol (step 714).

Figure 8:
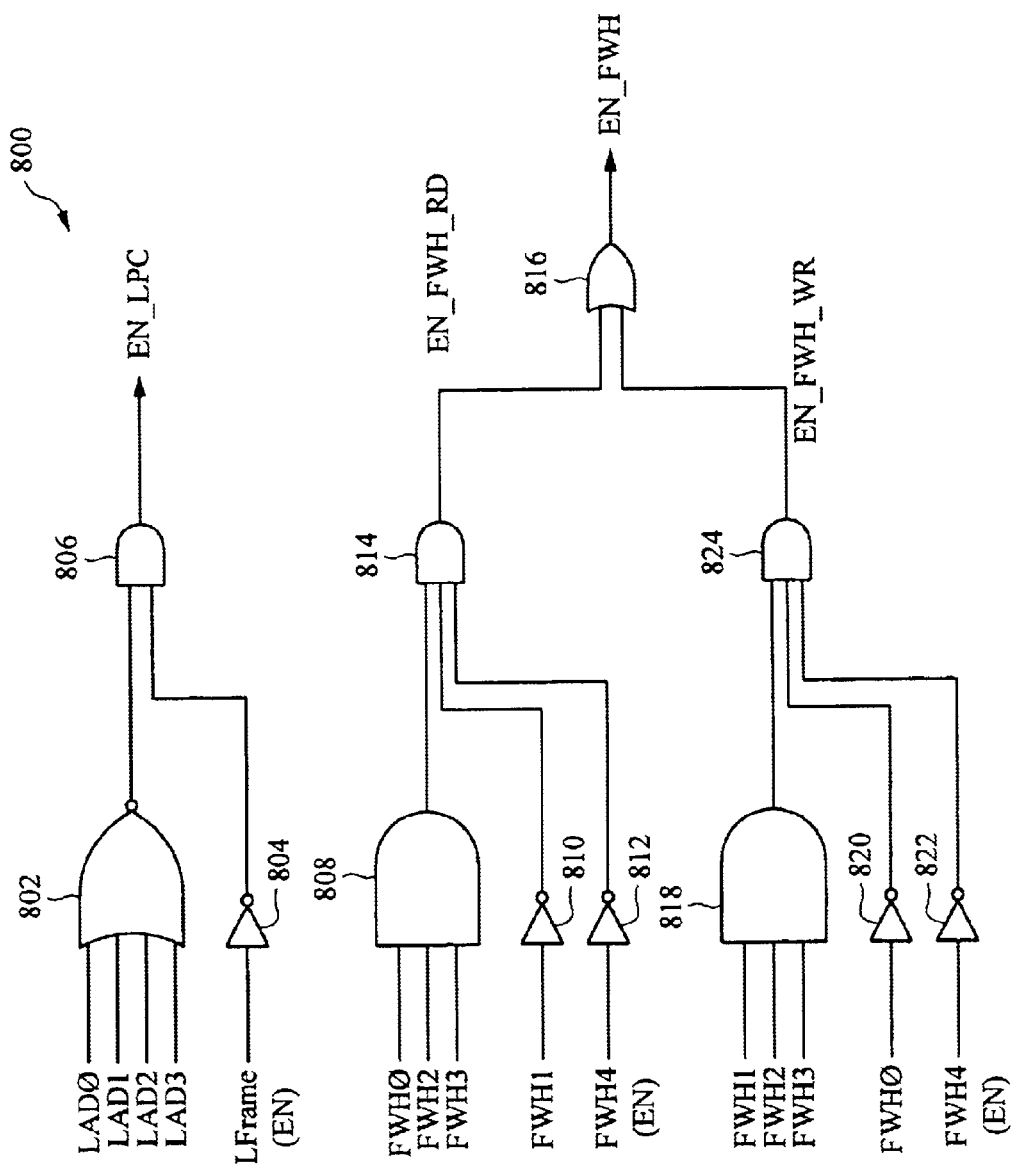
FIG. 8 is a circuit diagram of one embodiment of the protocol detection circuit of FIG. 2.

FIG. 8 shows a logical implementation 800 for one embodiment of protocol detection circuit 210 of FIG. 2 for generating the enable signals EN_FWH and EN_LPC. Signals on the LPC input pins LAD0–LAD3 are combined in a NOR gate 802. The output of NOR gate 802 is combined with the complement of the LPC enable signal LFrame (inverted by inverter 804) in an AND gate 806 to generate EN_LPC, which as described above is used to selectively enable and disable LPC protocol circuit 208.

Signals on FWH input pins FWH0, FWH2, and FWH3 are combined in an AND gate 808. The output of AND gate 808 is combined with the complement of the signal on FWH input pin FWH1 (inverted by inverter 810) and with the complement of the FWH enable signal FWH4 (inverted by inverter 812) in an AND gate 814 to generate EN_FWH_RD, which is provided to a first input of an OR gate 816. Signals on FWH input pins FWH1, FWH2, and FWH3 are combined in an AND gate 818. The output of AND gate 818 is combined with the complement of the signal on FWH input pin FWH0 (inverted by inverter 820) and with the complement of the FWH enable signal FWH4 (inverted by inverter 822) in an AND gate 824 to generate EN_FWH_WR, which is provided to a second input of OR gate 816. The output of OR gate 816 provides the signal EN_FWH, which as described above is used to selectively enable and disable FWH protocol circuit 206.

Note that signals LAD0–LAD3 and FWH0–FWH3 correspond to the same I/O pins 212, and signals LFrame and FWH4 correspond to the same I/O pin 212. It is to be understood that other logic structures may be used to generate EN_LPC and EN_FWH in accordance with present embodiments, and thus the logic circuit shown in FIG. 8 is exemplary.

Figure 9:
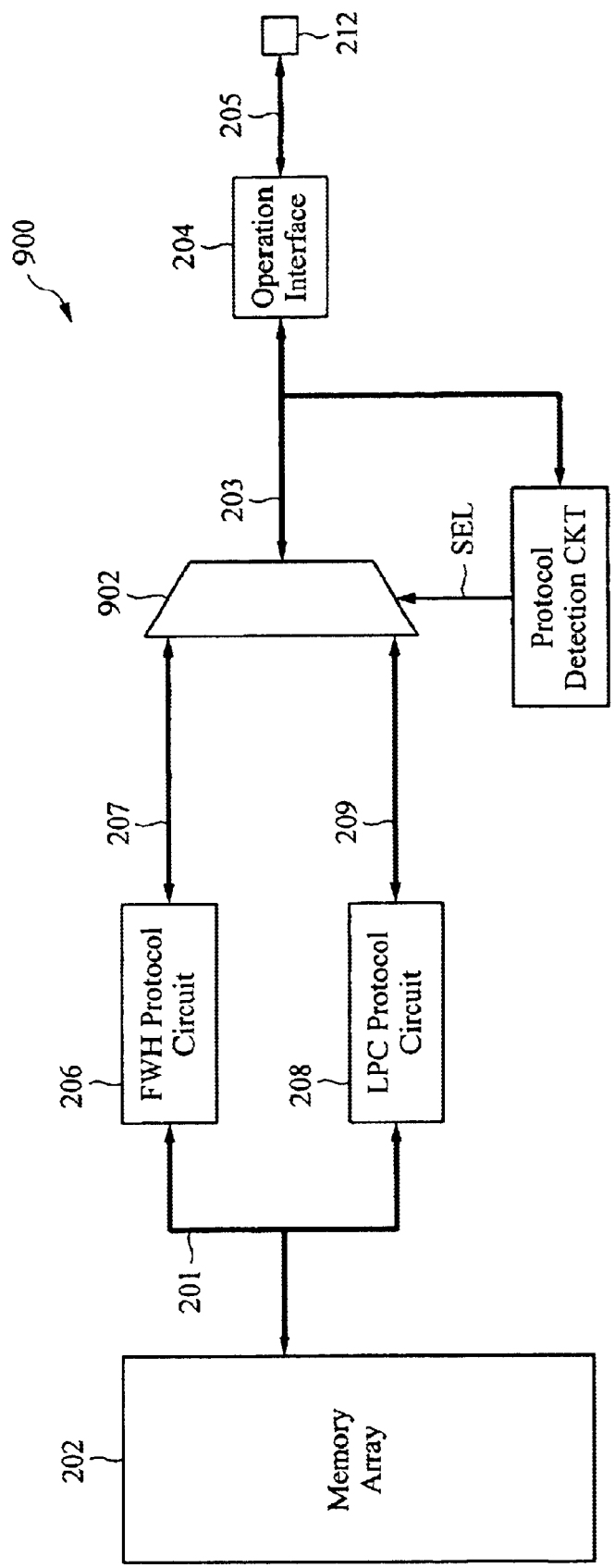
FIG. 9 is a block diagram of another embodiment of a memory device in accordance with the present invention.

Protocol detection circuit 210 may selectively enable and disable FWH protocol circuit 206 and LPC protocol circuit 208 using techniques other than those described above with respect to FIG. 2. For example, in some embodiments, protocol detection circuit 210 may utilize a multiplexer coupled between FWH protocol circuit 206 and LPC protocol circuit 208, as shown in FIG. 9. Protocol detection circuit 900 is another embodiment of memory device 108 of FIG. 1, and includes a multiplexer (MUX) 902 having a first input coupled to FWH protocol circuit 206 via bus 207, a second input coupled to LPC protocol circuit 208 via bus 209, an output coupled to operation interface 204 via bus 203, and a control terminal to receive a select signal from protocol detection circuit 210. For the embodiment of FIG. 9, protocol detection circuit 210 drives SEL to either logic high or logic low depending upon which communication protocol the host controller is employing. For example, in one embodiment, if the host controller is using the FWH communication protocol, protocol detection circuit 210 drives SEL to logic high, which in turn causes MUX 902 to select FWH protocol circuit 206. Conversely, if the host controller is using the LPC communication protocol, protocol detection circuit 210 drives SEL to logic low, which in turn causes MUX 902 to select LPC protocol circuit 208.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A memory device, comprising:
   an operation interface coupled to a host controller;
   a communication protocol detection circuit coupled to the operation interface;
   a first communication protocol circuit coupled to the operation interface and to the protocol detection circuit, the first communication protocol circuit configured to enable communication with the host controller according to a firmware hub (FWH) communication standard; and a second communication protocol circuit coupled to the operation interface and to the protocol detection circuit, the second communication protocol circuit configured to enable communication with the host controller according to a low pin count (LPC) communication standard.

2. The memory device of claim 1, further comprising a plurality of input/output (I/O) pins coupled to the operation interface.

3. The memory device of claim 1, wherein the communication protocol detection circuit is configured to select either the first communication protocol circuit or the second communication protocol circuit in response to signals provided by the host controller.

4. The memory device of claim 3, wherein the protocol circuit selected by the protocol detection circuit handles communication between the host controller and the memory device.

5. The memory device of claim 4, wherein the host controller comprises an I/O controller hub of a control chipset on a motherboard of a computer system.

6. The memory device of claim 5, wherein memory device comprises a BIOS memory device mounted on the motherboard.

7. The memory device of claim 6, wherein the memory device stores firmware code for the computer system.

8. The memory device of claim 5, wherein the memory device comprises a flash memory having a plurality of PMOS memory cells.

9. The memory device of claim 1, further comprising a multiplexer having a first input coupled to the first communication protocol circuit, a second input coupled to the second communication protocol circuit, an output coupled to the operation interface, and a control terminal coupled to the communication protocol detection circuit.

10. The memory device of claim 2, further comprising a parallel mode interface coupled to the plurality of I/O pins, the parallel mode interface for testing and programming the memory device.

11. A memory device coupled to a host controller, the memory device comprising:

a communication protocol detection circuit for automatically determining which of a plurality of communication protocols the host controller employs;

a first protocol circuit for implementing communication according to a first communication protocol;

a second protocol circuit for implementing communication according to a second communication protocol; and means for selecting either the first protocol circuit or the second protocol circuit to handle communications between the memory device and the host controller, wherein the first communication standard comprises a firmware hub (FWH) communication standard and the second communication standard comprises a low pin count (LPC) communication standard.

12. The memory device of claim 11, wherein the means for selecting comprises a multiplexer having a first input coupled to the first protocol circuit, a second input coupled to the second protocol circuit, an output coupled to the host controller, and a control terminal coupled to receive a select signal from the protocol detection circuit.

13. The memory device of claim 11, wherein the means for selecting comprises:

means for enabling the first protocol circuit; and means for disabling the second protocol circuit.

14. The memory device of claim 11, wherein the host controller comprises an input/output controller hub and the memory device comprises a BIOS memory device configured to store firmware code for a computer system associated with the host controller.

15. The memory device of claim 11, wherein the communication protocol detection circuit comprises:

means for receiving a control signal from the host controller; and means for comparing the control signal to a predetermined signal.

16. A method for operating a memory device coupled to a host controller mounted on a motherboard of a computer system, the method comprising:

determining which of a plurality of communication protocols the host controller employs to communicate with the memory device; and selecting one of a plurality of communication protocol circuits to handle communication between the memory device and the host controller, wherein a first of the communication protocol circuits enables communication with the host controller according to a firmware hub (FWH) communication standard and a second of the communication protocol circuits enables communication with the host controller according to a low pin count (LPC) communication standard that is different from the first communication standard.

17. The method of claim 16, wherein the selecting comprises enabling the selected communication protocol circuit; and disabling all other communication protocol circuits.

18. The method of claim 16, wherein the determining comprises:

receiving a control signal from the host controller, and comparing the control signal with a predetermined signal.

* * * * *